July 7, 1931.   C. P. MADSEN   1,813,502
MEANS OF TRANSMITTING POWER
Filed Feb. 2, 1925   2 Sheets-Sheet 1
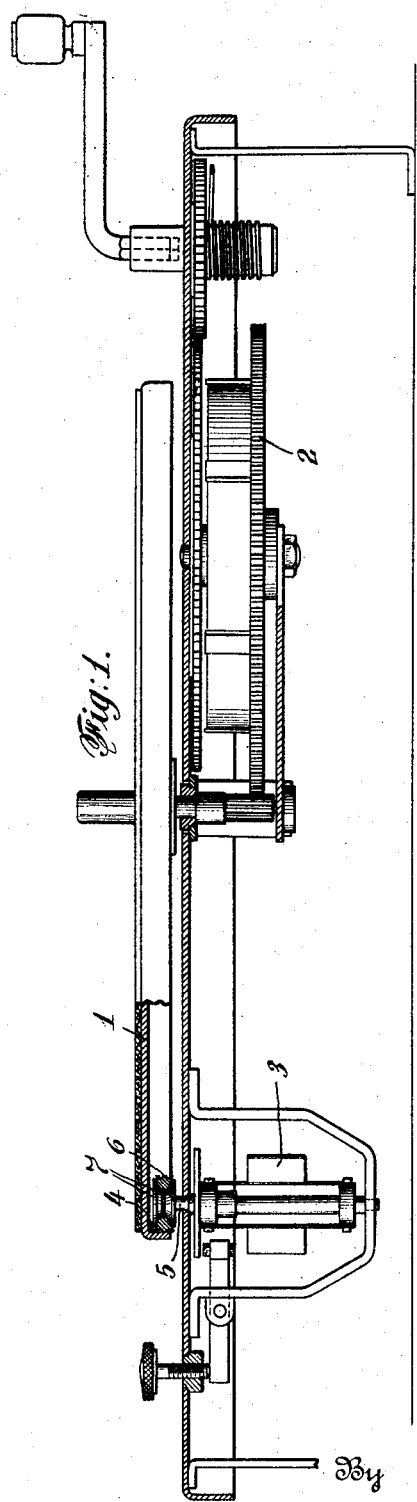
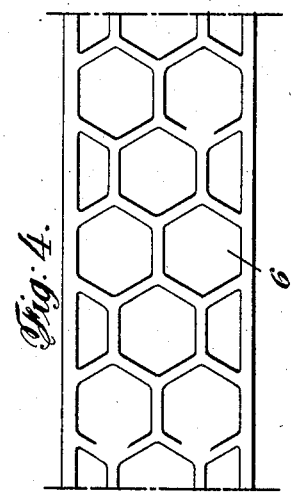
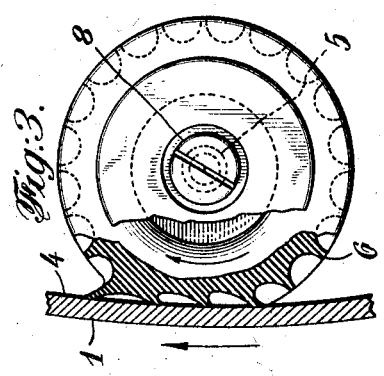
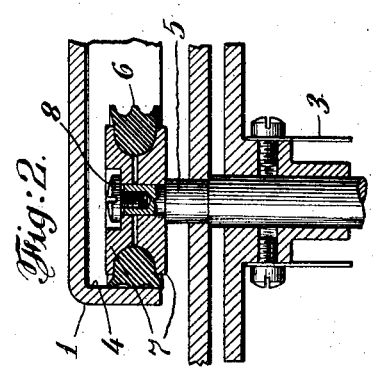
Inventor
Charles P. Madsen
By Attorney William W. Varney July 7, 1931.   C. P. MADSEN   1,813,502
MEANS OF TRANSMITTING POWER
Filed Feb. 2, 1925   2 Sheets-Sheet 2
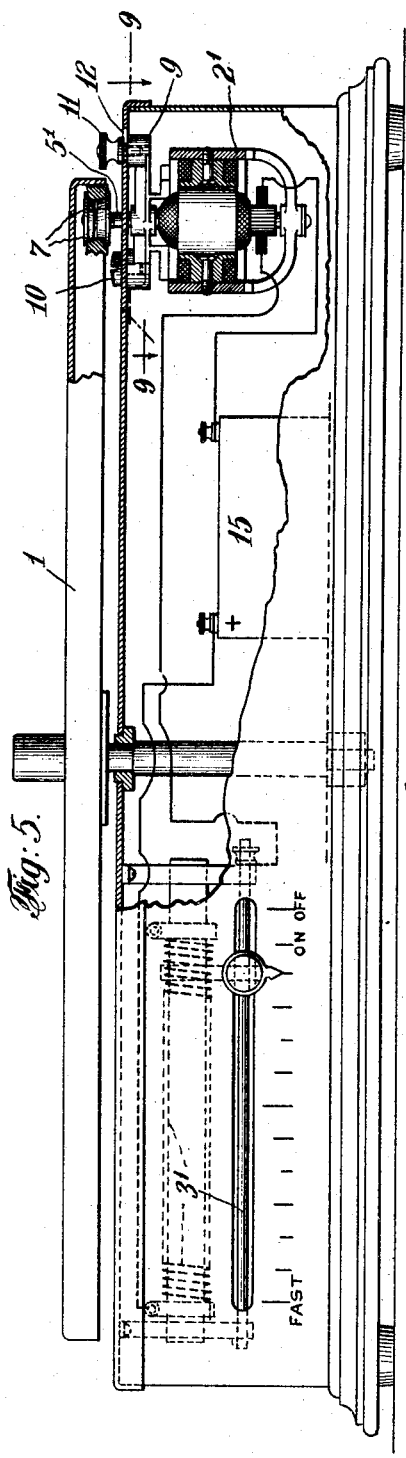
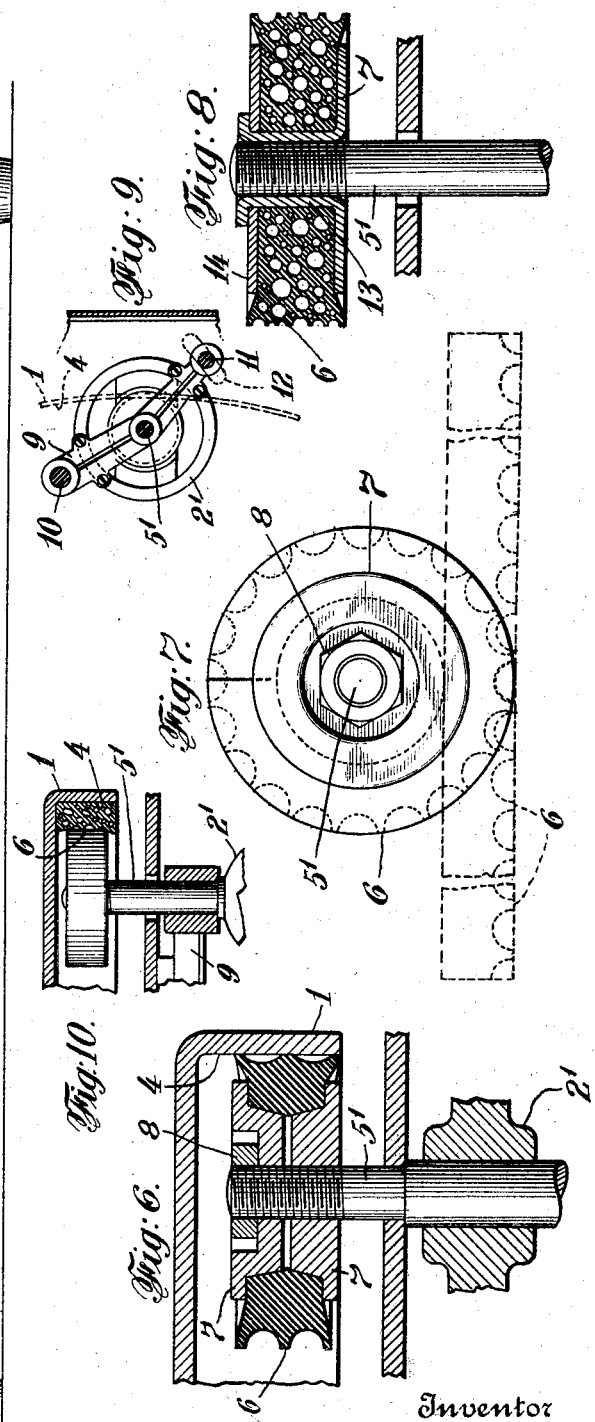
Inventor
Charles P. Madsen
By Attorney William W. Varney Patented July 7, 1931

1,813,502

UNITED STATES PATENT OFFICE

CHARLES P. MADSEN, OF NEW YORK, N. Y., ASSIGNOR, BY MESNE ASSIGNMENTS, TO WILLIAM W. VARNEY, OF BALTIMORE, MARYLAND

MEANS OF TRANSMITTING POWER

Application filed February 2, 1925. Serial No. 6,414.

I have discovered an entirely new system of driving, or transmitting power, which, I call the "air suction drive".

The object of my invention is the providing of a new and useful method and means for transmitting power, particularly useful in connection with phonographs, but it has many other useful applications, particularly for the transmission of comparatively small amounts of power at relatively high speed, where such transmission must be smooth or uniform in action and noiseless.

A further object of my invention is the providing an improved material for the surface of my air suction drive.

A further object of my invention is the providing an improved means of mounting material comprising the surface of my air suction drive.

A further object of my invention is the providing an improved surface for my air suction drive.

A further object of my invention is the providing of means for regulating the contacting of the surfaces in my air suction drive.

With the foregoing and other objects in view, my invention consists of the methods employed, combination and arrangement of systems, apparatus and means as hereinafter specifically provided and illustrated in the accompanying drawings, wherein is shown the preferred embodiment of my invention as applied to a phonograph, but it is understood that changes, variations and modifications may be resorted to which come within the scope of the claims hereunto appended.

The improved material mentioned herein, may consist of any organic substance, properly prepared and formed and possessing property of elasticity to a marked degree, and substantially resisting the passage of air through the tissues thereof. While I have found caoutchouc in its various vulcanized forms well adapted for the purpose and durable, there are many other substances available, and that may be used, among which I might mention animal's skin on a resilient or elastic backing, various gums, and certain mineral derivatives in combinations.

Referring to the present state of the art with reference to phonographs, it is customary to provide motors with a centrifugal governor running at relatively high speed, and great difficulty is experienced in providing a reliable and noiseless driving mechanism for such a governor. It is very difficult and impossible to obtain satisfactory results with any type of gearing which can be made commercially. Not only does such gearing produce a great deal of noise, but the ratio of the increase in speed is high so that any lost action, or back-lash, in a gear tooth results in large errors. For instance, in a phonograph motor of usual construction a lost motion of .002 inch in a gear tooth at the motor is multiplied to a jump of .6 inch at the turn-table edge. Since the usual musical note in commercial records is from one-half to one inch long, it will be seen that such a jump is quite audible.

These jumps do take place for the reason which requires the use of the governor, that is, no coil or volute spring as commonly used unwinds uniformly. It unwinds by jerks, commonly called "fluttering", or "chugging." These chugs may equal more than one-half of the average torque of the spring and in extreme cases, due to lack of spring lubrication, or other defects, the torque of the spring may for a few seconds drop to nearly zero. In this case it is intended that the momentum of the governor shall carry the system until the spring lets go. It thus happens that the pressure line on the gearing reverses and the lost motion which develops causes the jump in the turn-table.

It has, therefore, become necessary in American practice to drive the governors in phonograph motors with a worm. But not only are such worms extremely expensive to manufacture, but the ratio of speed is such that an unfavorable load on the worm must be used, and the power loss due to this cause is from ten to forty-five percent. In other words, I have found by measurement that in most commercial phonographs more power is consumed by friction in the worm drive of the governor than it takes to play the record.

Many attempts have been made to drive these governors with well-known types of friction drive. There are two reasons why the known types of friction drive are not practical. In the first place, it is very difficult, if not impossible, in ordinary commercial construction to develop enough pressure to prevent slippage. In other words, unless the pressure between the driving and driven friction wheels is greater than any commercial spring motor of existing types can pull, the turn-table will jump due to slippage. In the second place, in order to transmit successfully the necessary power to maintain the speed of the governor, so great a pressure has to be used that the loss of power is greater than that consumed by the worm drive.

By using a disc of sponge rubber properly mounted and the surface attenuated as hereinafter described the above difficulties are overcome. The driven wheel is driven with practically no pressure whatever on it. When I say practically no pressure, I mean that it is unbelievably small compared with the pressure necessary to drive the same governor with a friction wheel of the same size in the same motor. For instance, in driving from the edge of a nine-inch turn-table to a nine-sixteenth inch wheel which, when the turn-table is turning at standard speed of eighty revolutions per minute, drives the governor at twelve hundred revolutions per minute, which has been determined as the best speed for governing then when a felt wheel is used for friction it requires a pressure of one pound on the bearing and the motor must develop a torque of two pounds at the driving tooth to move it at full speed. With my air suction drive wheel I have been unable to measure the pressure, but believe it to be less than ten grams, and in any event the motor needs develop less than one-tenth of a pound torque at the driving tooth to move it at full speed and it would appear that the torque required at the driven wheel surface is less than one-hundredth part of that required for the best friction wheel. I find that even at this slight pressure there is practically no slippage whatever, for instance, in stopping the turn-table which weighs one pound, from full speed of eighty revolutions per minute by stalling the governor with the felt friction wheel under one pound pressure, the turn-table will make two complete revolutions before stopping, while with my improved wheel it stops almost instantly with practically no slippage.

In examining my improved wheel and its action when in motion under a microscope, I find an air-suction drive. These wheels may be cut from sheet rubber which has been blown with air and the result is that the cut edges show a large number of small practically half-spherical and semi-half-spherical cavities with very thin walls. The edge of the wheel is mounted so against the driving rim that it is compressed very slightly, say about one-sixty-fourth of an inch, which is about half the depth of the cellular cups. The result is that as the face of the wheel approaches the driving surface, these cups are compressed and air is forced out. While in full contact then, there is a partial vacuum, in receding the effect of the vacuum is to cause each individual cup to cling to the surface, and under the microscope each individual cup could be seen clearly projecting out like little tubes from the side which was leaving the driving wheel. The amount of pressure which it takes to compress the little cups is extremely small compared with the holding power of the vacuum formed when they are moved.

It is preferable when sponge rubber is used to cut wheels from sheets which have a solid rubber wall on each side, and I find it convenient to reinforce the sides with metal discs somewhat less in diameter than that of the wheel, the amount less, of course, depending upon the amount of power transmitted and the degree of variation in the power and the amount of compression between said metal discs which compression tends to make the central portion of the rubber wheel more firm and at the same time attenuating or stretching the surface; exterior of said metal discs, this stretching makes the cups of the surface more susceptible to air-tight contact with the contacting surface of the part engaged by the rubber wheel.

In the specific case cited, in which the governor is driven from a nine-inch turn-table running at eighty revolutions per minute, and the rubber wheel is nine-sixteenths inch in diameter, the wheel is actually made one-thirty-second inch over size so that when compressed one-sixty-fourth inch the radius is nine-thirty-seconds inch.

This arrangement makes not only a much cheaper but a very much better governor drive for phonographs than anything heretofore made. It operates absolutely silently. It increases the efficiency of the motor. It permits of practically no slippage which can be detected aurally.

In place of sponge rubber used in the above description, a moulded ring of proper material may be used as shown in Figures 2 and 6; or specially formed sheets with a desired surface from which strips of the proper size may be cut, as shown in Figure 7. The surface or configuration shown in Figure 4 may be used in either case or a different, regular or irregular configuration may be used.

The use of this system and apparatus for transmitting power may be reversed with new results. It may, for instance, instead of being used for a governor driven by a turn-table, be placed to be driven by an electric motor and drive the turn-table. It is old to use friction drive but new to use air suction drive. I am aware ordinary rubber has been used for friction drives, but ordinary rubber, that is, vulcanized rubber discs as heretofore made, are still friction wheels. It has never been possible by any of these means to drive the phonograph successfully without the usual mechanical motor and governor tied to it, and it has been necessary to use comparatively large motors, as, for instance, on the order of one-tenth to one-twentieth horsepower. I find, however, that the loss of power and freedom from slipping with my improved means of driving is so low that I can drive a phonograph turn-table with no governor or other mechanism attached thereto with a motor of a theatrical horse-power of three-thousandths; in other words, with a motor whose consumption is such that the power could be supplied by an ordinary flashlight battery.

In the drawings of the herein-described embodiment of one application of my invention, Fig. 1 is a partial, sectional view in elevation of a spring-motor actuated phonograph, in which my air-suction drive is used in driving the governor as hereinbefore suggested.

Fig. 2 is an enlarged sectional view in elevation of one application of my air-suction drive as shown in Fig. 1, the surface being moulded in circular form and attenuated exterior of clamping surface 7.

Fig. 3 is an enlarged and slightly exaggerated sectional view in plan of the contacting surfaces of my air-suction drive as viewed under the microscope and as applied and illustrated in Figs. 1 and 2.

Fig. 4 shows an enlarged partial surface development of the surfaces used in Figs. 1–3, in the application of my air-suction drive.

Fig. 5 is a partial sectional view of an electrically driven phonograph wherein my air-suction drive surface, drives instead of being driven, as herein-above suggested.

Fig. 6 is an enlarged sectional view in elevation of my air suction drive as shown in Fig. 5, and especially adapted to mount the surface cut from sheets and wrapped around, as shown in Fig. 7; this view, also Fig. 8, particularly shows the stretching of the surface exterior of the clamping means.

Fig. 7 shows an enlarged view in outline of a section of a strip cut from a sheet and then wrapped around to form the air-suction drive surface shown in Fig. 6; in this means of mounting the inner surface of the sheet in bending is slightly compressed and the outer or contacting surface slightly stretched.

Fig. 8 is an enlarged sectional view in elevation of a surface composed of sponge rubber, stamped out of sheets of the same thus forming annular rings. This material gives very good results and is a very cheap construction, but does not have the same efficiency, owing to its irregular formation.

Fig. 9 shows a plan view of the adjusting means for the contacting surfaces, as illustrated in Fig. 5 and taken through 9—9 of said figure, and Fig. 10 shows a modification in which the air-suction drive surface is being driven by a driving wheel driven by the electric motor.

Similar numerals refer to similar parts throughout the several views.

1 is the turn-table of a phonograph driven by a motor, 2 or 2′ which may be either mechanical as shown in Fig. 1 or electrical as shown in Fig. 5, which motors have novel features and which form the subject matter of other applications, but any well known motor or source of power may be used.

3 is the governor of conventional form, any well known type may be provided with regulating and stop means. 3′ is a rheostat for controlling the electric motor 2′.

4 is the driving or driven surface of the turn-table 1, and may be plane as shown in Figs. 1, 2, 5, 6 or be provided with my air-suction drive surface, as shown in Fig. 10.

5 is the shaft of the governor on which is secured the mounting means for my air-suction drive as shown in Figs. 1, 2, 5, 6 and 8, or the driving wheel as shown on 5′ in Figs. 5, 9 and 10 on the shaft 5′ of a driving means.

6 is the air-suction drive surface and when in the form of rings may be clamped between clamping surfaces 7, which surfaces may be held in position or adjusted as shown in the several figures.

8 is the adjusting means for clamping surfaces 7 and adjusting the same.

Referring particularly to Figs. 5 and 9, 9 is the motor carrying yoke fulcrum at 10 and adjustably secured by means of clamping nut 11 operating in slot 12.

In the modification shown in Fig. 8, 13 is the sleeve of a grummet, the face of which is the clamping surface 7, 14 being the keeper which forms the other clamping surface 7, the sleeve being burred over the keeper, compressing the same to the desired amount. The sleeve is threaded within or tapped to receive the screw of the shafts 5 or 5′.

In Fig. 5, 15 is a dry battery or cell which operates motor 2′ through controller 3′ by proper electrical connection shown in the figure.

In the application of my air suction drive to dental engines, tachometers, sensitive drills or other light running machinery, I prefer the form shown in Fig. 2; that is, the moulded form.

In the securing of the surface form out of stamped material, cement should be used in securing it to its carrier in addition to the clamping means. I prefer, however, to use cement in all cases.

Having thus described my invention, what I claim and desire to secure by Letters Patent is:

An air suction driving element having an attenuated external operative surface superimposed over a compressed interior supporting body, said surface being provided with air suction driving elements integral therewith, and means for laterally maintaining said interior supporting body in compression.

CHARLES P. MADSEN.